June 13, 1939. J. B. DOYLE 2,161,913
SPROCKET
Filed Oct. 28, 1938
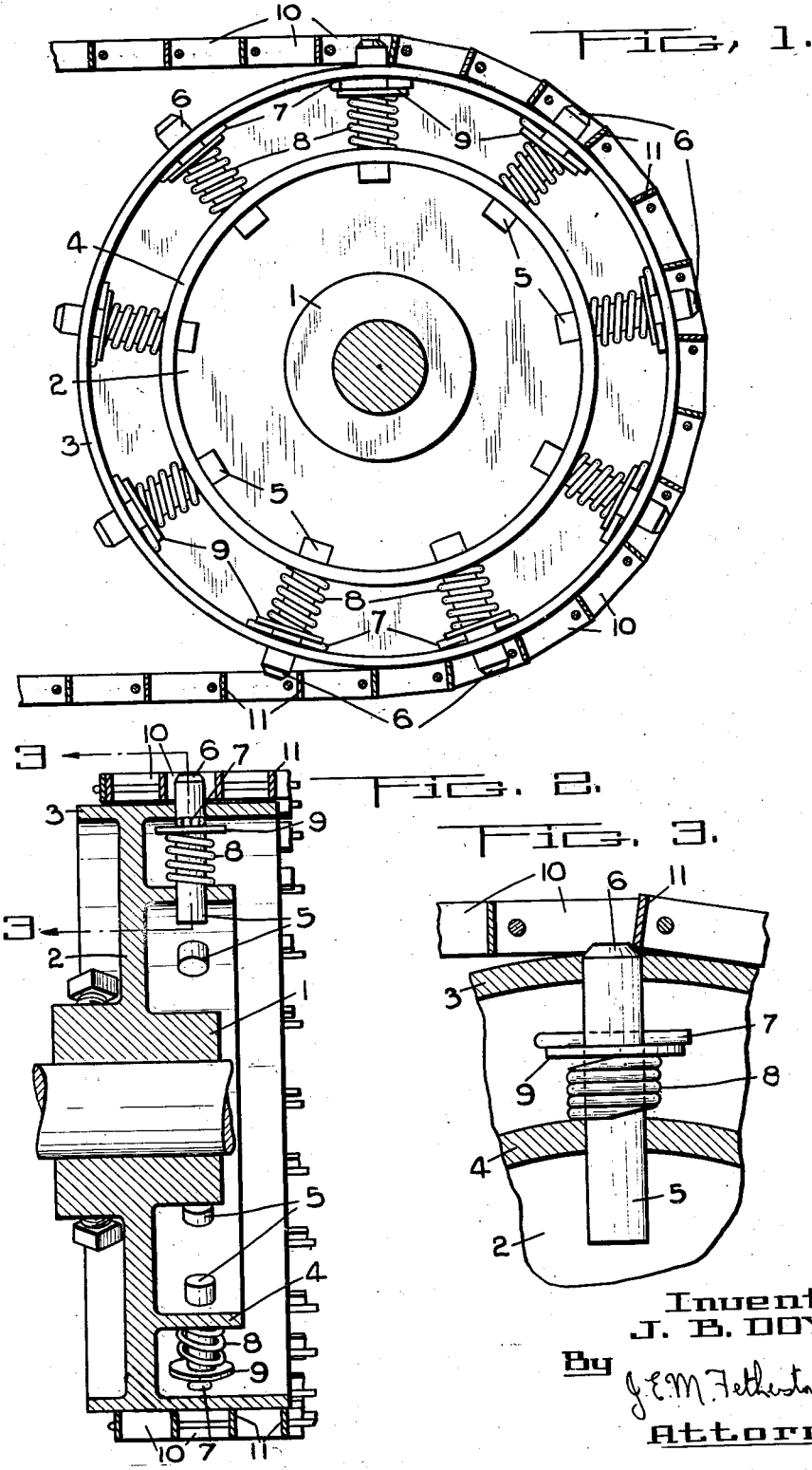
Inventor
J. B. DOYLE
By J.E.M. Fetherstonhaugh
Attorney Patented June 13, 1939

2,161,913

UNITED STATES PATENT OFFICE 2,161,913

SPROCKET

James Bernard Doyle, Simcoe, Ontario, Canada, assignor to Canner's Machinery Limited, Hamilton, Ontario, Canada, a company of Ontario, Canada Application October 28, 1938, Serial No. 237,522

2 Claims. (Cl. 74—244)

My invention relates to improvements in sprockets and an object of my invention is to devise a sprocket in which the teeth are retractible into the sprocket should the links of the chain, belt or conveyor mounted on the sprocket not register with its teeth and strike the same.

A further object is to construct a sprocket in which the retractible teeth will normally be spring-held in their operative position to enter the orifices in the links of the chain, belt or conveyor.

While my sprocket is particularly intended for use with link type flexible steel belting employed in the canning and packing industry in conveyors, scalders, exhausters, elevators, vegetable and fruit washers, it is susceptible for use for many other purposes such as in the glass industry.

It is found that chains or flexible steel belts have a tendency to stretch and consequently when a rigid toothed sprocket is employed, such teeth do not register with the orifices in the links but the links ride up on the teeth causing wear on both links and teeth and preventing the chain or belt running smoothly and silently.

With a sprocket provided with my retractible teeth when the latter register with the orifices in the links the sprocket functions in the normal manner, but when such chain or belt is stretched and some link orifices are out of register with the teeth, such teeth are pressed inwardly by such links, the remaining teeth which are in register with some of the link orifices taking up the load.

With the above and other objects in view which will hereinafter appear as the specification proceeds my invention consists, in its preferred embodiment, of the construction and arrangement all as hereinafter more particularly described and illustrated in the accompanying drawing in which:

Fig. 1 represents a side elevation of a sprocket constructed according to my invention showing a flexible steel belt thereon.

Fig. 2 is a cross-sectional view thereof, and

Fig. 3 is an enlarged fragmentary sectional view through the line 3—3 (Fig. 2).

Like characters of reference indicate corresponding parts in the different views of the drawing.

My sprocket comprises a hub 1 suitably secured on a shaft and having a radially extending web 2 with a peripheral circular rim 3. A circular flange 4 concentric with the rim 3 extends from one side of the web 2 and is disposed internally of the rim and in spaced relation thereto.

A plurality of spaced apart sprocket teeth 5 in the form preferably of pins of circular cross-section extend radially and freely through the rim 3 and flange 4, the outer ends 6 of such teeth being preferably bevelled or of truncated conical form.

A transverse cotter pin 7 extends through each tooth 5 and is adapted to engage the inner surface of the rim 3 to limit the outer movement of each tooth, and a spiral spring 8 is provided on each tooth with its inner end engaging the flange 4 and its outer end engaging a washer 9 interposed on the tooth 5 between such outer end of the spring and the cotter pin 9. Such springs force the teeth outwardly to the limit of their movement wherein the cotter pins engage the rim and the outer ends of such teeth protrude outwardly from the rim whereby they are received into the orifices 10 of the links 11 of the flexible steel belt as illustrated in Figs. 1 and 2, when such link orifices are in register with such teeth.

Should, however, due to the elongation of the belt or otherwise, the link orifices not register with the teeth as is illustrated in Fig. 3, the links 11 striking the end 6 of the tooth will press such tooth inwardly against the action of the spring and permit the belt to ride on the rim 3 without interference from the tooth.

When the link disengages itself from the tooth, under the influence of the spring the tooth will be restored to its normal operative position as illustrated in Figs. 1 and 2.

While the teeth 5 are shown aligned circumferentially on the rim 3 they could be placed in any other position as required by the particular construction of the chain, belt or conveyor.

From the above description it will be apparent that I have devised a sprocket which will be self-compensating for any variations in the chain or belt links and which will be smooth and silent in operation.

What I claim as my invention is:

1. In a sprocket, the combination with its rim and a concentric flange disposed within said rim, of inwardly movable radially disposed spaced apart teeth extending freely through the rim and flange with their outer ends normally protruding outwardly of such rim, and resilient means located between the rim and the flange for retaining such teeth in such normal position.

2. In a sprocket, the combination with its rim and a concentric flange disposed within said rim, of radially disposed spaced apart pins extending freely through the rim and flange with their outer ends normally protruding outwardly beyond such rim, an abutment on each pin located on the portion thereof between the rim and the flange, and a spiral spring on each pin located between the abutment and the flange.

JAMES BERNARD DOYLE.